United States Patent

[11] 3,631,425

[72] Inventor Tung-Men Tang
San Jose, Calif.
[21] Appl. No. 888,630
[22] Filed Dec. 29, 1969
[45] Patented Dec. 28, 1971
[73] Assignee International Business Machines Corporation
Armonk, N.Y.

[54] MAGNETIC HEAD SLIDER WITH ORIFICE

4 Claims, 2 Drawing Figs.

[52] U.S. Cl. ........ 340/174.1 E, 179/100.2 P
[51] Int. Cl. ........ G11b 5/10, G11b 2/120
[50] Field of Search ........ 179/100.2 P, 100.2 CA; 340/174.1 E, 174.1 F

[56] References Cited

UNITED STATES PATENTS

| | | | |
|---|---|---|---|
| 3,480,936 | 11/1969 | Gerlach et al. | 340/174.1 E |
| 2,937,240 | 5/1960 | Harker | 340/174.1 E |
| 2,863,004 | 12/1958 | Maclzy et al. | 340/174.1 E |
| 3,229,268 | 1/1966 | Solyst | 340/174.1 E |
| 2,950,353 | 8/1960 | Fomenko | 340/174.1 E |
| 3,123,677 | 3/1964 | Lawken et al. | 340/174.1 E |
| 3,071,773 | 1/1963 | Haughton et al. | 179/100.2 |

*Primary Examiner*—Bernard Konick
*Assistant Examiner*—Vincent P. Canney
*Attorneys*—Hanifin and Jancin and Nathan N. Kallman

ABSTRACT: A magnetic head assembly is disclosed for cooperating in transducing relation with a moving magnetic medium. The assembly comprises a slider having an air-bearing surface, a magnetic transducer, and resilient means for mounting the transducer to the slider and for providing relative movement between the transducer and the slider. The slider has an orifice therethrough defining an aperture in the air bearing surface. In view of the pressure differential between the air bearing surface and the other surface of the slider, contaminants are urged through the orifice and out of the slider.

*INVENTOR*
TUNG-MEN TANG

*BY* *Nathan N. Kallman*
ATTORNEY

MAGNETIC HEAD SLIDER WITH ORIFICE

BACKGROUND OF THE INVENTION

1. Field of the Invention

This invention is directed to a magnetic head assembly for cooperating in transducing relation with a magnetic medium and, more particularly, to an assembly including a slider, a transducer and resilient means for mounting the transducer to the slider and for providing relative movement between the transducer and the slider.

2. Description of the Prior Art

Presently, there are three well-known types of magnetic recording systems, using magnetic tape, drums, or disks, respectively. With these systems, one or more magnetic transducers or heads are either in contact with a recording medium or are airborne. In the latter system the magnetic heads may "-fly" on an air-bearing formed between the medium and the magnetic head structure. In the magnetic disk systems presently known, noncontact recording employing air-bearing head assemblies have been utilized to avoid the deleterious effects of friction and wear which would normally be experienced if a rotating magnetic disk were to contact the head.

In addition, it is known that the amplitude of the signal being detected or read out from the rotating disk is dependent upon the spacing between the sensing head and the record medium. The further away that the scanning head is positioned from the surface of the disk, the lower the signal amplitude. In addition, if the disk storage system processes high density data, such that the frequency of the binary data or transitions is increased to obtain more information per discrete unit area, then the signal amplitude would necessarily have to be increased to obtain a suitable signal-to-noise ratio. Therefore, it is incumbent that the head be either in contact or very closely spaced from the recording medium, i.e., pseudocontact, so that a signal of suitable amplitude may be obtained. This invention is directed toward a magnetic head assembly that is to be used in contact with, or substantially in contact with, the record surface of a rotating magnetic record disk and that will include a magnetic transducing element that is moveable with respect to its supporting structure whereby the transducer rides on the record surface and follows surface variations thereof.

An object of this invention is to provide a magnetic head assembly for cooperating in transducing relation with a magnetic medium comprising a slider having an air-bearing surface, means for biasing the air-bearing surface of the slider into proximity with the surface of the associated magnetic medium, a transducer, and resilient means for mounting the transducer to the slider and for providing relative movement between the transducer and the slider, the resilient means maintaining the transducer in substantially constant contact with the magnetic medium surface in response to surface variations thereof.

In accordance with the preceding object, it is another object of the invention to provide a slider of the type set forth and further having an orifice therethrough defining an aperture in the air-bearing surface thereof so as to create a pressure differential between the air-bearing surface and the other surface of the slider, the other surface being exposed to an ambient pressure, whereby particles disposed in the vicinity of the aperture near the air-bearing surface are forced through the orifice and out of the slider.

Still another object in connection with the foregoing objects is to provide a magnetic head assembly of the type set forth, wherein the resilient means afford a constant pressure of the transducer on the associated magnetic medium surface.

Furthermore, in accordance with the preceding objects, another object is to provide a magnetic head assembly wherein the resilient means comprises a spring having one end suspended within the orifice near the air-bearing surface of the slider and having two legs at the other end thereof, each of the legs bonded at the respective extremities thereof to the other surface of the slider at points disposed laterally outward of the outer lateral edges of the orifice, thereby preventing movement of the transducer in a plane parallel to the air-bearing surface.

Further objects of the invention pertain to the particular arrangement of the parts of the magnetic head assembly and the several components thereof whereby the above-outlined and additional operating features thereof are attained.

The invention both as to its organization and method of operation, together with further objects and advantages thereof, will best be understood with reference to the following specification taken in connection with the accompanying drawings.

Figure 1:
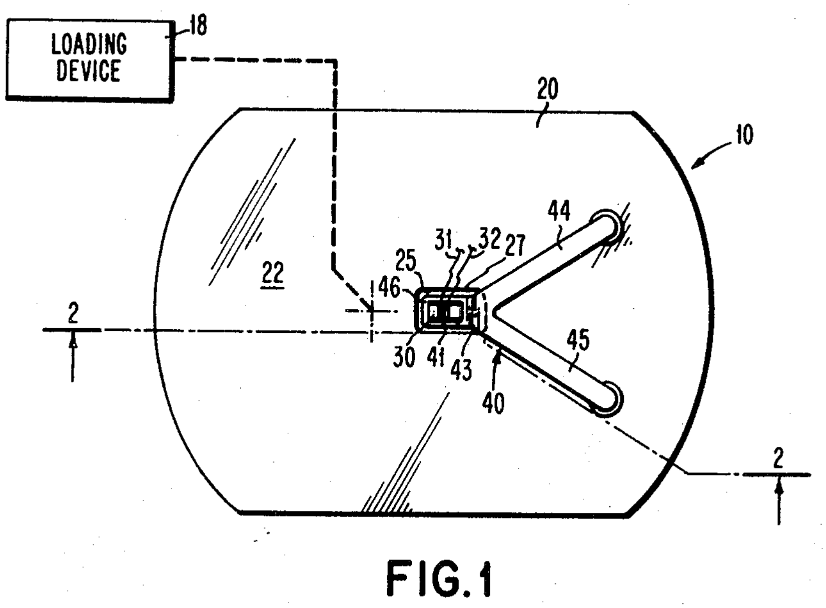
FIG. 1 is a plan view of an embodiment of the magnetic head assembly incorporating the features of the invention.
Figure 2:
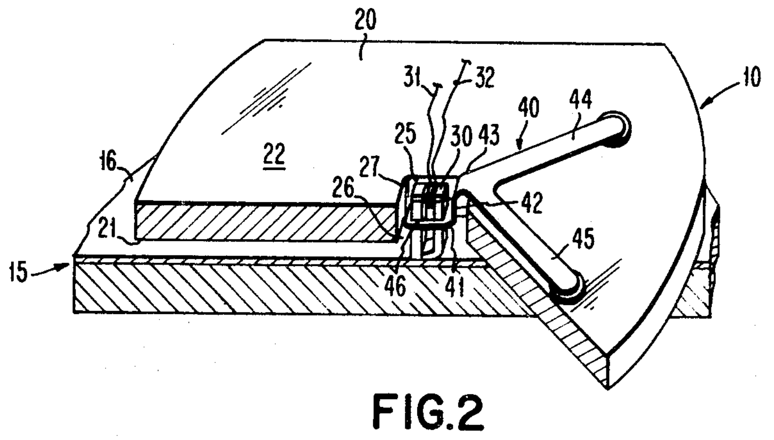
FIG. 2 is a perspective view of the magnetic head assembly and the magnetic recording medium along the lines 2—2 of FIG. 1 with sections thereof broken away for clarity.

Referring now to the drawings, and more particularly, to FIGS. 1 and 2 thereof, there is shown a magnetic head assembly generally designated 10, for contact recording on a record surface 16 of a moving magnetic medium 15, the magnetic head assembly 10 including a slider 20, a loading device 18 for coarsely positioning the slider 20 into proximity with the surface 16, a magnetic transducer 30, and resilient means 40 mounted to the slider 20 for holding the magnetic transducer 30.

The magnetic medium 15 is well known in the art and in this particular case comprises a disk having a plurality of circumferential tracks radially separated from one another.

The slider 20 shown in the drawings is of a generally rectangular shape having outwardly curved shorter sides, and is made of a ceramic or stainless steel material. As shown, the slider 20 has an air-bearing surface 21 disposed adjacent to the record surface 16 of the magnetic medium and a second outer surface 22, parallel to the surface 21. Centrally disposed in the air-bearing surface 21 extending normally thereto is an orifice 25 having a substantially rectangular cross section and defining an aperture 26 in the air-bearing surface 21 and an aperture 27 in the other surface 22.

The loading mechanism 18 shown diagrammatically in FIG. 1 is disposed against the other surface 22 of the slider and coarsely loads or biases the air-bearing surface 21 of the slider 20 into proximity with the record surface 16 of the magnetic medium 15.

The magnetic transducer 30 comprises a magnetic core having a gap therein disposed toward and abutting the record surface 16 and a spiral winding around the core having conducting leads 31 and 32 which develops an electrical signal from the information on the record surface in a manner that is well known in the art.

The resilient means or spring 40 is generally S-shaped and has three portions, a first portion 41 and a second portion 42 and a third portion 43. The first portion 41 and the third portion 43 are substantially parallel to one another and are normally joined at the respective inner ends thereof by the second portion 42. The spring is preferably bent to shape from a unitary plate of a nonmagnetic resilient material which may particularly be beryllium copper. The first portion 41 of the resilient means 40 has a transducer mounting aperture 46 disposed centrally therein for rigidly encompassing and holding the transducer 30. Cement applied to the inner wall of the aperture 46 will permanently hold the transducer 30. In addition, the first portion 41 is suspended within the orifice 24 near and substantially parallel to the air-bearing surface 21 of the slider. The third portion 43 of the resilient means 40 comprises two symmetrical legs 44 and 45 which extend outwardly in the shape of a "V." The legs 44 and 45 are disposed laterally outwardly of the outer lateral edges of the orifice 24 and are bonded at the respective outer extremities to the other surface 22 of the slider 20, thereby to mount the resilient means 40 to the slider 20, whereby to prevent the transducer 30 held therein from moving in a plane parallel to the air-bearing surface 21 while allowing relative movement between the transducer 30 and the slider 20 in a direction substantially normal to the air-bearing surface 21.

Upon rotation of the magnetic medium 15, an air-bearing is formed between the air-bearing surface 21 of the slider 20 and the record surface 16 of the magnetic medium 15. The spring 40 is initially flexed so that the recording or transducing surface of the transducer 30 protrudes slightly from the air-bearing surface 21 of the slider and lightly contacts the record surface 16. As the slider 20 glides on the air-bearing, the transducer is forced against the recording medium 15 by a small amount of deflection of the spring 40. However, since the transducer 30 is mounted to the slider 20 and relatively movable normally with respect thereto, the variation of contact pressure between the transducer 30 and the magnetic medium 15 is practically eliminated and the transducer is maintained in substantially constant contact with the magnetic medium in response to surface variations thereof.

The fact that there is an air-bearing formed between the record surface 16 and the air-bearing surface 21 causes a pressure gradient to be formed within the orifice 25 from the aperture 26 in the air-bearing surface 21 to the aperture 27 in the other surface 22 of the slider 20. More particularly, a pressure differential is created between a higher pressure region along the air-bearing surface 21 and a lower pressure region along the other surface 22, this surface being exposed to the ambient pressure. Therefore, a chimney effect is created upon rotation of the recording medium 15. Particles that may be disposed in the vicinity of the aperture 26 in the air-bearing surface 21 are forced through the orifice 25 and out of the aperture 27 in the other surface 22 of the slider 20. The orifice 25 thereby provides a self-cleaning type of operation so that debris disposed in front of the transducer 30 is automatically cleaned from the track.

This invention provides an in-contact magnetic recording assembly that does not cause excessive wear of the magnetic head or of the magnetic recording medium by exerting a constant light pressure therebetween and simultaneously cleans contaminants from the path of the transducer. The assembly is responsive to variations in the surface of the recording medium and permits the transducer to follow these variations.

The parts are shown in the drawings as contacting in a horizontal plane. The drawings are intended to apply only to illustrate the invention and it is well known that the magnetic recording components of the general type illustrated may be mounted in many different positions.

While there have been described what is at present considered to be the preferred embodiments of the invention, it will be understood that various modifications may be made therein and it is intended to cover in the appended claims all such modifications as fall within the true spirit and scope of the invention.

What is claimed is:

1. A magnetic head assembly for cooperating in transducing relation with a magnetic medium comprising:

a slider having an air-bearing surface and an orifice therethrough defining an aperture in said air-bearing surface so as to create a pressure differential within the orifice between said air-bearing surface and the other surface of said slider, said other surface being exposed to an ambient pressure, whereby particles disposed in the vicinity of said aperture near said air-bearing surface are forced through said orifice and out of said slider;

a magnetic transducer; and resilient means for mounting said transducer to said slider, said resilient means being unitary and having one end suspended within said orifice near said air-bearing surface of said slider and having the other end bonded to said other surface, and for suspending said transducer within said orifice and for providing relative movement between said transducer and said slider so that said transducer is maintained in substantially constant contact with the magnetic medium in response to surface variations thereof.

2. The magnetic head assembly set forth in claim 1, wherein said resilient means has a transducer mounting aperture disposed near said one end, said transducer being mounted therein and disposed below said air-bearing surface of said slider.

3. The magnetic head assembly set forth in claim 2, wherein said other end of said resilient means comprises two legs extending angularly outwardly, each of said legs being bonded at the respective outer ends to said other surface of said slider at points disposed laterally outward of the outer lateral edges of said orifice so as to prevent movement of said transducer in a plane parallel to said air-bearing surface.

4. In a magnetic head assembly operable to transfer information to and from a moving magnetic surface of a magnetic medium wherein said assembly includes a transducer having a magnetic core member adapted to contact said magnetic surface, an improved means for mounting said core member in contact with said magnetic surface so as to minimize the effect of contaminants from said magnetic surface or said core generated as a result of the relative movement therebetween, said improved mounting means comprising;

a single air-bearing slider element having a first surface positionable in gliding relationship to said magnetic surface;

means for biasing said element toward said medium to maintain said surfaces in gliding relationship a predetermined distance apart;

a portion of said slider element defining an orifice extending completely through said element from said first surface to an opposite surface, the aperture of said orifice in the first surface being disposed in a region of above-ambient air pressure resulting from said air-bearing and the other aperture of said orifice being disposed in said opposite surface in a region of lower pressure, and a second biasing means connected between said core and said opposite surface to bias the distal end of said core into contact with said medium so as to maintain a relatively constant pressure therebetween independently of any minor variations in the distance between said air-bearing surface and said magnetic surface, said second biasing means including means positioning said core member freely in said orifice with the distal end thereof extending a predetermined distance beyond the plane defined by said air-bearing surface whereby wear particles from either said core member or said magnetic surface generated as a result of sliding contact therebetween during operation are automatically removed from said medium through said orifice as a result of the pressure differential existing at opposite ends thereof.

* * * * *